United States Patent
Enami et al.

(10) Patent No.: US 6,812,285 B2
(45) Date of Patent: Nov. 2, 2004

(54) THERMOPLASTIC ELASTOMER COMPOSITION FOR A POWDER FOR SLUSH MOLDING AND SKIN FORMED THEREFROM

(75) Inventors: Hirohide Enami, Akashi (JP); Kenrou Ono, Hyogo (JP); Kenji Kubomoto, Hyogo (JP); Yoshihiro Toda, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 369 days.

(21) Appl. No.: 10/055,169

(22) Filed: Oct. 26, 2001

(65) Prior Publication Data

US 2002/0151649 A1 Oct. 17, 2002

(30) Foreign Application Priority Data

| Oct. 31, 2000 | (JP) | ........................................ | 2000-331886 |
| Feb. 27, 2001 | (JP) | ........................................ | 2001-051764 |
| Jun. 26, 2001 | (JP) | ........................................ | 2001-192147 |

(51) Int. Cl.$^7$ ............................ C08L 9/00; C08L 47/00; C08L 53/00
(52) U.S. Cl. .............................. 525/88; 525/95; 525/98
(58) Field of Search .............................. 525/88, 95, 98

(56) References Cited

U.S. PATENT DOCUMENTS

| 4,745,149 A | 5/1988 | Eisele et al. |
| 2002/0072561 A1 | 6/2002 | Johoji et al. |

FOREIGN PATENT DOCUMENTS

| DE | 19905292 A1 | 9/1999 |
| EP | 0757077 A1 | 2/1997 |
| EP | 0794225 A1 | 10/1997 |
| EP | 0811657 A2 | 10/1997 |
| EP | 0834533 A1 | 8/1998 |
| WO | WO00/15681 | 3/2000 |

OTHER PUBLICATIONS

Mitsuboshi Belting Ltd: "WPI World Patent Information Derwent, Derwent, GB", vol. 21, NR. 95 XP002056634 & Abstract of JP 07 082433 A (Mitsoboshi Belting Ltd.) Mar. 28, 1995.

*Primary Examiner*—Patrick D. Niland
(74) *Attorney, Agent, or Firm*—Wood, Phillips, Katz, Clark & Mortimer

(57) ABSTRACT

A thermoplastic elastomer composition for a powder material used for slush molding. The thermoplastic elastomer composition consists of a polypropylene resin and 20 to 500 parts by mass of a hydrogenated block copolymer per 100 parts by mass of the polypropylene resin. The hydrogenated block copolymer has a) at least one polymer block A with a primary component that is a vinyl aromatic hydrocarbon monomer unit and b) at least one polymer block B with a primary component that is a hydrogenated butadiene monomer unit. The polymer block B has a hydrogenation degree of at least 90%. The vinyl aromatic hydrocarbon in the hydrogenated block copolymer is present in an amount more than 5 mass % and less than 25 mass %. The polymer block B before hydrogenation contains 62 mol % or more 1, 2 bonds on average. The melt flow rate (MFR) of the thermoplastic elastomer composition is at least 10 g/10 min at 230° C. under a load of 2.16 kgf in accordance with Japanese Industrial Standards (JIS) K7210.

109 Claims, 1 Drawing Sheet

THERMOPLASTIC ELASTOMER COMPOSITION FOR A POWDER FOR SLUSH MOLDING AND SKIN FORMED THEREFROM

BACKGROUND OF THE INVENTION

1. Field of the Invention

This invention relates to a thermoplastic elastomer composition for a powder material used for slush molding, as to form a skin. More specifically, the invention relates to a thermoplastic elastomer composition containing a hydrogenated block copolymer compatible with a polypropylene resin.

2. Background Art

It is known to form skins on automobile interior parts, such as instrument panels, console boxes, door trims, etc. through a powder slush molding processing using soft powder materials. It is known to use plasticized polyvinyl chloride resin for this purpose. Powder slush molding is desirable in that a skin with a soft texture can be produced as well as one with flexible design characteristics. For example, the skins can be made to simulate leather wrinkles and/or stitching.

Powder slush molding differs from injection molding and compression molding processes in that the powder materials are not placed under pressure during the forming process. Thus, the powder material, once melted, is required to flow readily to produce a uniform thickness oft times over a complex metal mold. The melt viscosity also must be low so that the powder deposited against the mold can melt and form a film without being placed under pressure. It is also important that the skin be easily released from the mold after it is formed and cooled.

In one conventional process, as disclosed in Japanese unexamined patent application publication No.7-82433, pulverized polypropylene resin and a specific thermoplastic styrene elastomer are mixed in a ratio of 70/30 to 30/70 by mass. The thermoplastic styrene elastomer is selected from styrene-ethylene butylene-styrene block copolymers containing 20 mass % or less styrene, styrene-ethylene propylene-styrene block copolymers containing 20 mass % or less styrene, and hydrogenated styrene-butadiene rubber containing 20 mass % or less styrene, so that the composition is compatible with polypropylene resin and suitable for powder molding.

In Japanese unexamined patent application publication No. 10-30036, a thermoplastic elastomer composition for slush molding is disclosed that is an ethylene-α-olefin copolymer, a polyolefin resin, and a hydrogenated diene copolymer. The hydrogenated diene copolymer is prepared by hydrogenating a conjugated diene copolymer or a conjugated diene-vinyl aromatic hydrocarbon random copolymer containing 25 mass % or less vinyl aromatic hydrocarbon. The hydrogenation degree is at least 70%.

In Japanese patent publication No. 2973353, a thermoplastic elastomer composition for slush molding is disclosed with a thermoplastic elastomer selected from ethylene-ethylene butylene-ethylene block copolymers and ethylene-octene copolymers blended with a polypropylene resin and a hydrogenated styrene-butadiene random copolymer. The mixture is pulverized.

In the above styrene-ethylene butylene-styrene block copolymers, there is no disclosure of hydrogenated block copolymers having a main block consisting of butadiene monomer units which, before hydrogenation, has 62 mol % or more 1, 2 bonds on average.

Problems arose in the past where the elastomers were not compatible with the polypropylene resin. As an example, when ethylene-propylene rubber (EPR), ethylene octene copolymer (EOR), styrene-ethylene butylene-styrene block copolymer containing 25 mass % or more styrene, styrene-ethylene propylene-styrene block copolymer and/or hydrogenated styrene-butadiene rubber were blended, the elastomer components did not uniformly disperse into polypropylene resin. As a result, the compositions often were not as formable as desired, had poorer than desired physical properties, and blushed from folding. Further, the physical properties varied considerably with temperature change, thereby making it impractical to use skins made from these compositions for certain applications, such as for storage box covers for air bags.

SUMMARY OF THE INVENTION

In one form, the invention is directed to a thermoplastic elastomer composition for a powder material used for slush molding. The thermoplastic elastomer composition consists of a polypropylene resin and 20 to 500 parts by mass of a hydrogenated block copolymer per 100 parts by mass of the polypropylene resin. The hydrogenated block copolymer has a) at least one polymer block A with a primary component that is a vinyl aromatic hydrocarbon monomer unit and b) at least one polymer block B with a primary component that is a hydrogenated butadiene monomer unit. The polymer block B has a hydrogenation degree of at least 90%. The vinyl aromatic hydrocarbon in the hydrogenated block copolymer is present in an amount more than 5 mass % and less than 25 mass %. The polymer block B before hydrogenation contains 62 mol % or more 1, 2 bonds on average. The melt flow rate (MFR) of the thermoplastic elastomer composition is at least 10 g/10 min at 230° C. under a load of 2.16 kgf in accordance with Japanese Industrial Standards (JIS) K7210.

In one form, the thermoplastic elastomer composition further consists of 20 to 200 parts by mass per 100 parts by mass of the polypropylene resin of at least one of a) a block and b) a random copolymer of styrene and a conjugated diene with a hydrogenation degree of at least 90%. The styrene is present in the at least one of the a) block and b) random copolymer of styrene and a conjugated diene in an amount more than 14 mass % and less than 50 mass %.

In one form, the thermoplastic elastomer composition further includes 5 to 250 parts by mass of an ethylene-α-olefin copolymer rubber per 100 parts by mass of the hydrogenated block copolymer.

In one form, the polypropylene resin consists of a propylene-α-olefin copolymer having a melting point of 120° to 145° C. measured with a differential colorimeter at a heating rate of 5° C./min.

The thermoplastic elastomer composition may further include 0.02 to 5.0 parts by mass of an organic peroxide per 100 parts by mass of the polypropylene resin.

The thermoplastic elastomer composition may further include a process oil.

In one form, the thermoplastic elastomer composition is freeze-pulverized to produce particles having a size to pass through a sieve not greater than 1.00 mm.

In one form, the thermoplastic elastomer composition is treated by hot-cutting in water to produce particles having an effective mean diameter of 1.00 mm or less.

The invention is also directed to thermoplastic elastomer composition for a powder material used for slush molding, which thermoplastic elastomer composition consists of a polypropylene resin, 20 to 300 parts by mass of a random copolymer of styrene and a conjugated diene per 100 parts by mass of the polypropylene resin, and 20 to 200 parts by mass of at least one of a) a block and b) a random copolymer of styrene and a conjugated diene per 100 parts by mass of the polypropylene resin and having a hydrogenation degree of at least 90%. The random copolymer has a hydrogenation degree of at least 90%. The styrene is present in the random copolymer in an amount of more than 5 mass % and less than 14 mass %. The conjugated diene consists of at least 60 mol % of one of a) 1, 2 or b) 3, 4 bonds on average. The styrene is present in the at least one of the a) block and b) random copolymer of styrene and a conjugated diene in an amount of more than 14 mass % and less than 50 mass %.

The thermoplastic elastomer composition may further include 5 to 250 parts by mass of an ethylene-α-olefin copolymer rubber per 100 parts by mass of hydrogenated copolymer.

The invention is further directed to a skin formed by slush molding powder made from a thermoplastic elastomer composition as in any of the variations described above.

DETAILED DESCRIPTION OF THE DRAWINGS

Figure 1:
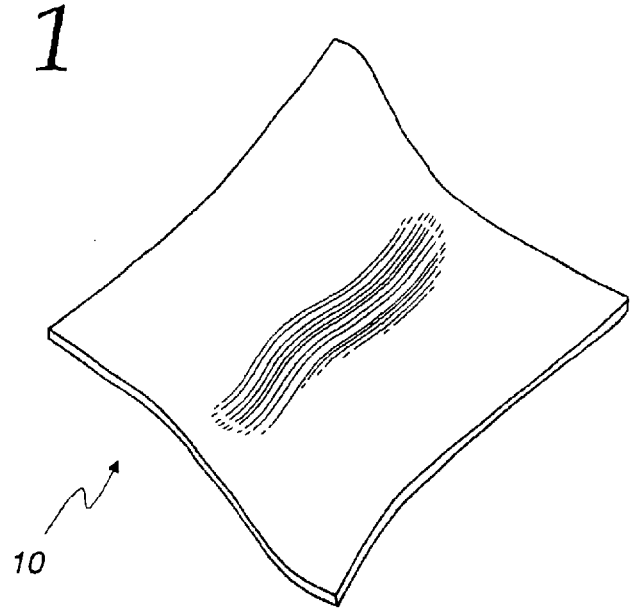
FIG. 1 is a perspective view of a piece of skin, made according to the present invention.

In FIG. 1, a skin, made according to the present invention, and suitable for a wide range of uses, is shown at 10. The skin 10 may be used, for example, as part of an automobile interior, such as on instrument panels, console boxes, door trims, as a cover for an air bag storage box, etc. However, the invention is not limited to a product in a skin form.

The inventive skin 10 is made from a polypropylene resin, which may be a polypropylene homopolymer or a block or random copolymer consisting of α-olefin. Preferably, the block copolymer consists of ethylene, which is used as the α-olefin to give flexibility to the skin. To form the skin 10 using a pressureless, powder, slush molding process, the melt flow rate (MFR) for the polypropylene resin should be at least 10 g/10 min, and preferably 40–800 g/10 min at 230° C. under a load of 2.16 kgf in accordance with JIS K7210.

The melting point of propylene-α-olefin copolymer in the above-described polypropylene resin is 120° to 145° C. or less, measured at a heating rate of 5° C./min with a differential colorimeter. The propylene-α-olefin copolymer may be a block or a random copolymer. The α-olefin may be ethylene, butylene, pentene, or octane. Ethylene is preferred by reason of its cost. Using propylene-α-olefin copolymer makes possible the production of an easily meltable thermoplastic elastomer composition for slush molding with a relatively low melting point and good formability characteristics.

If the MFR for the polypropylene resin is less than 10 g/10 min, 100 parts by mass of the polypropylene resin may be mixed with 0.02 to 5.0 parts by mass of an organic peroxide and kneaded at 120° to 250° C. to result in a lower molecular weight polypropylene resin having an MFR of 100 to 800 g/10 min.

The polypropylene resin kneaded with the organic peroxide may be melted and kneaded with a hydrogenated block copolymer. If the polypropylene resin is melted and kneaded with the hydrogenated block copolymer and the organic peroxide simultaneously, the hydrogenated block copolymer may move to the surface of the polypropylene resin sheet being formed, resulting in a lower molecular weight copolymer. After heat aging, the surface of the polypropylene resin may become sticky and glossy.

The above-mentioned organic peroxide is preferably diacyl peroxide, peroxy ester, diacyl peroxide, di-t-butyl peroxide, t-butylcumyl peroxide, dicumyl peroxide, 2,5-dimethyl-2,5-di(t-butyl peroxy)-hexane-3,1,3-bis(t-butyl peroxy-isopropyl) benzene, and 1,1-di-butyl peroxy-3,3,5-trimethylcyclohexane, which are used for the cross-linking of rubber and resin. Preferably, the half life for one minute by thermal decomposition is 150° to 250° C.

During the kneading process at 120° to 250° C., the organic peroxide lowers the molecular weight of the polypropylene resin by cutting the main chain of the resin, thereby allowing the thermoplastic elastomer composition to have a better melt flowability. The organic peroxide is added at 0.02 to 5.0 mass % for the thermoplastic elastomer composition. Generally, less than 0.02 mass % of the organic peroxide does not have enough decompositionable ability to cut the main chain of the polypropylene resin, as a result of which the melt flowability of the thermoplastic elastomer composition may not be as high as desired. On the other hand, more than 5.0% of the organic peroxide may produce over-decomposition and lead to the deterioration of mechanical characteristics, such as the tensile strength, of the resulting skin and any other parts made according to the invention.

The hydrogenated block copolymer preferably has good compatibility with the polypropylene resin. Kneading the block copolymer with the polypropylene resin makes the mixture flexible, resulting in a thermoplastic elastomer composition that is resistant blushing when folded.

The above-described hydrogenated block copolymer consists of at least one polymer block A of which a primary component that is a vinyl aromatic hydrocarbon monomer unit and at least one polymer block B of which a primary component is a hydrogenated butadiene monomer unit. The hydrogenation degree of the polymer block B is 90% or more. At least one of the polymer blocks positioned at the ends is a polymer block B, and preferably the hydrogenated block copolymer has a structure A-B, A-B-A-B, B-A-B-A-B, or (B-A-B=) n -X, where n is an integer of 2 or more and X is a residue of a coupling agent.

The vinyl aromatic hydrocarbon monomer unit is at least one selected from among, but not limited to, alkyl styrenes such as styrene, α-methylstyrene, p-methylstyrene, and p-tert-butylstyrene, para-methoxystyrene, vinylnaphthalene, and the like, and preferably styrene. The amount of the vinyl aromatic hydrocarbon is more than 5 mass % and less than 25 mass % for the hydrogenated block copolymer. An amount of 5 to 15 mass % is generally effective in obtaining an adequately flexible skin.

The block having the butadiene monomer unit as its primary component before hydrogenation has 62 mol % or more 1, 2 bonds on average. If the bonds are less than 62 mol %, folding the sheet formed therewith may cause blushing. A representative example of such a hydrogenated block copolymer is "Tuftec L-515" made by Asahi Chemical Industry Co., which is a styrene-ethylene-butylene-styrene block copolymer (SEBS), as disclosed in International Publication WO00/15681.

The mixing amount of the hydrogenated block copolymer is 20 to 500 parts by mass for 100 parts by mass of the polypropylene resin. Generally, the higher the amount of the polypropylene resin, the harder the skin surface becomes. In contrast, generally the lower the amount, the lower the tensile strength becomes.

The hydrogenated block copolymer used in the present invention is preferably highly compatible with the polypropylene resin. It has been verified with a transmission electron microscope that hydrogenated block copolymer having particle diameter of 15 to 210 mm, becomes uniformly dispersed in the polypropylene resin.

Blending the polypropylene resin and the hydrogenated block copolymer allows the hydrogenated block copolymer to be relatively uniformly dispersed in the polypropylene resin. This contributes to good formability. A thermoplastic elastomer composition for slush molding results which makes possible the production of a skin with good physical properties and flexibility and controlled blushing resulting from folding thereof.

Ethylene-α-olefin copolymer rubber is a highly oil-absorbable elastomer. Simultaneously blending it with the hydrogenated block copolymer makes the polypropylene resin compatible. In addition, the rubber preferably tends to absorb process oil and oligomers contained in the composition. To accomplish this, at least one of ethylene-α-olefin copolymers and noncrystalline ethylene-α-olefin-nonconjugated diene copolymers is used. The α-olefin preferably is one having 3 to 10 carbons such as propylene, 1-butene, or 1-octene, and more preferably, ethylene-propylene rubber (EPR) or ethylene-octene copolymer (EOR).

The above-described ethylene-α-olefin copolymer rubber is less compatible with the polypropylene resin than the hydrogenated block copolymer to be used according to the present invention. When the rubber is kneaded or blended with the polypropylene resin, it disperses in micrometers, thereby lowering the tensile strength thereof. By adding highly oil-absorbable ethylene-α-olefin copolymer, the oligomers contained in the composition and the oil are absorbed, so that bleeding may be avoided.

The ethylene-α-olefin copolymer is added in an amount of 5 to 250 parts by mass per 100 parts by mass of the hydrogenated block copolymer. If the amount is less than 5 parts by mass, the ethylene-α-olefin copolymer may not absorb oligomers contained in the composition or the oil sufficiently. In contrast, if the amount is more than 250 parts by mass, the ethylene-α-olefin copolymer may not be dispersed into the polypropylene resin, so that the tensile strength may be lower than desirable.

The hydrogenated block or random copolymer of styrene and conjugated diene used according to the present invention, having a styrene content of more than 14 mass % and less than 50 mass % and a hydrogenation degree of 90% or more, is less compatible with the polypropylene resin than the hydrogenated block copolymer. As a result, it may not be uniformly dispersed so that a two-phase structure results. Thus, the mixture alone blended with the polypropylene resin is generally not suitable for powder slush molding because of the poor sheet formability characteristics.

Suitable products are, for example, "Tuftec H1062, H1052", made by Asahi Chemical Industry Co. and "KRATON G1650" made by Shell Chemicals, which are styrene-ethylene butylene-styrene block copolymers (SEBS), and "DYNARON 2324P", made by JSR Corporation, which is a hydrogenated styrene butadiene random copolymer (H-SBR).

A suitable random copolymer of styrene and conjugated diene has a hydrogenation degree of 90% or more, with the content of the styrene being preferably more than 5 mass % and less than 14 mass %. The conjugated diene contains 60 mol % or more 1, 2, or 3, 4 bonds, on average. The random copolymer is a hydrogenated random copolymer, which has good compatibility with polypropylene. Kneading the hydrogenated random copolymer, as well as the hydrogenated block copolymer, with the polypropylene, allows the resin to be flexible, thus resulting in a product with good resistance to blushing.

The amount of the styrene in the above-described random copolymer is preferably more than 5 mass % and less than 14 mass %. If the content is less than 5 mass % or more than 14 mass %, the random copolymer may be less compatible with the polypropylene resin, hence lowering the flexibility of molded sheets and tending to cause blushing at fold locations.

The number of 1, 2 or 3, 4 bonds in the conjugated diene is preferably 60 mol % or more on average. If the number is less than 60 mol %, the molded sheet tends to blush at folding locations due to the decrease in flexibility. For the above-described hydrogenated random copolymers, "DYNARON 2320P" and "DYNARON 2321P", both offered by JSR, are suitable.

If process oil is added to the inventive composition, the oil is absorbed into the elastomer contained in the composition, and thereby the melt viscosity is lowered. Also the hardness of the skins is lowered, contributing to flexibility. The above-mentioned process oil is one used for rubbers, classified into paraffin, naphthene, and aromatic oil. Preferably, a paraffin oil is used as the process oil. The amount of the process oil is preferably 5 to 200 parts by mass for 100 parts by mass of the hydrogenated block copolymer. An amount of more than 200 parts by mass may bring about deterioration of tensile properties. An amount of less than 5 parts may result in a relatively hard skin due to the fact that the melt viscosity does not lower.

A thermal stabilizer, such as one used for known polyolefins, may be employed. Normally phenolic and phosphorus oxidation inhibitors are used as well, however they are not necessary.

In addition, hindered amine or benzotriazole may be used as a photostabilizer.

An organic or inorganic colorant, as used for known olefins, may be used. Further, lubricants such as fatty acid metal and bulking agents such as calcium carbonate or talc may be added.

The inventive compositions are melted and kneaded together preferably using any of the following six methods. However, the invention should not be viewed as so limited.

Method No. 1

A hydrogenated block copolymer is blended with a polypropylene resin having an MFR of 100 to 800 g/10 min, and kneaded together at 120 to 250° C. No organic peroxide is added.

Method No. 2

A hydrogenated block copolymer and an ethylene-α-olefin copolymer rubber, or a hydrogenated block or random copolymer of styrene and conjugated diene, are blended together with a polypropylene resin having an MFR of 100 to 800 g/10 min kneaded at 120 to 250° C. No organic peroxide is added.

Method No. 3

A hydrogenated block copolymer, a process oil, ethylene α-olefin copolymer rubber, and hydrogenated block copolymer or random copolymer of styrene and conjugated diene, is added to polypropylene resin having an MFR of 100 to 800 g per 10 minutes and kneaded together at 120–250° C. No organic peroxide is added.

Method No. NO. 4

Organic peroxide is blended in 0.02 to 5.0 parts by mass, in advance, with polypropylene resin having an MFR of 100 g/10 min and kneaded together at 120 to 250° C. to change the MFR into the range of 100 to 800 g/10 min. A hydrogenated block copolymer and an ethylene-α-olefin copolymer rubber, or a hydrogenated block or random copolymer of styrene and conjugated diene, are simultaneously blended with the polypropylene resin, having an MFR of 100 to 800 g/10 min, and kneaded at 120 to 250° C.

Method No. 5

An organic peroxide is blended in an amount of 0.02 to 5.0 parts by mass with polypropylene resin having an MFR of less than 100 g/10 min and an ethylene-α-olefin copolymer rubber, or a hydrogenated block or random copolymer of styrene and conjugated diene, and kneaded together at 120 to 250° C. A hydrogenated block copolymer is then blended and kneaded together at 120 to 250° C.

Method No. 6

Organic peroxide is blended in an amount of in 0.02 to 5.0 parts by mass with polypropylene resin having an MFR of 100 g/10 min, an ethylene-α-olefin copolymer rubber, or a hydrogenated block or random copolymer of styrene and conjugated diene, and a process oil, and kneaded together at 120 to 250° C. A hydrogenated block copolymer is then blended and kneaded at 120 to 250° C.

The compositions are melted and kneaded together in accordance with the following six methods.

Method No. 1

A hydrogenated random copolymer and a hydrogenated block, or random, copolymer and a hydrogenated block, or random, copolymer of styrene and conjugated diene, are blended together with polypropylene resin having an MFR of 100 to 800 g/10 min and kneaded at 120 to 250° C. No organic peroxide is added.

Method No. 2

A hydrogenated random copolymer, a hydrogenated block, or random, copolymer of styrene and conjugated diene, and an ethylene-α-olefin copolymer rubber are blended with polypropylene resin and kneaded together at 120 to 250° C. No organic peroxide is added.

Method No. 3

A hydrogenated random copolymer, a hydrogenated block copolymer, or random copolymer of styrene and conjugated diene, a process oil, and an ethylene-α-olefin copolymer rubber are blended together with polypropylene resin and kneaded at 120 to 250° C. No organic peroxide is added.

Method No. 4

An organic peroxide is pre-blended in 0.02 to 5.0 parts by mass with polypropylene resin and kneaded at 120 to 250° C. to change the MFR of the polypropylene resin into the range of 100 to 800 g/10 min. A hydrogenated random copolymer, a hydrogenated block, or random, copolymer of styrene and conjugated diene, and an ethylene-α-olefin copolymer rubber are blended together with the polypropylene resin having an MFR of 100 to 800 g/10 min and kneaded at 120 to 250° C.

Method No. 5

An organic peroxide is blended in 0.02 to 5.0 parts by mass with polypropylene resin and an ethylene-α-olefin copolymer rubber and kneaded at 120 to 250° C. Thereafter, a hydrogenated random copolymer and a hydrogenated block, or random, copolymer of styrene and conjugated diene, are blended and kneaded at 120 to 250° C.

Method No. 6

An organic peroxide is blended in an amount of 0.02 to 5.0 parts by mass with polypropylene resin, an ethylene-α-olefin copolymer rubber, and a process oil and kneaded at 120 to 250° C. A hydrogenated random copolymer and a hydrogenated block, or random, copolymer of styrene and conjugated diene, are blended and kneaded at 120–250° C. This method may be carried out using two sequential steps or performing one-pass kneading with a vent port.

In the blending step, additives dry-blended by a V-type blender, a tumbler, a Henschel mixer, or the like, are delivered from a supplying hopper. Process oil is infused through the vent port. The mixture is melted and kneaded by a biaxial extruder adjusted to a temperature of 120 to 250° C. and formed into a pellet.

Alternatively, process oil is mixed with the hydrogenated block copolymer and the ethylene-α-olefin copolymer rubber, which are components of the elastomer, and kneaded together in an internal mixer such as a kneader or a Banbury mixer. After the mixture is formed into a pellet, the pellet and polypropylene resin are dry-blended together, melted, and kneaded by a uniaxial or biaxial extruder set to a temperature of 120 to 250° C., and thereafter formed into a pellet.

The MFR of the pellet is preferably 10 g/10 min, as measured at 230° C. and under a load of 2.16 kgf. Otherwise, the skin tends to develop pinholes because of the relatively melt flowability.

The pellet formed with the above-described composition is pulverized with an impact-type pulverizer such as a turbo mill, a pin mill, a hammer mill. The pellet may be frozen by liquid nitrogen and pulverized. Alternatively, depending on the composition, the melted resin may be treated with a spray, such as a disk atomizer, to be cooled, and thereby powdered.

The pulverized resin is sifted through 1.00 mm-sieve so that the mean primary particle size is 100 to 800 μm. Then an organic or inorganic powder modifier is added and mixed with the resin in preparation for powder slush molding.

Also, the resin prepared by the hot cut method can be screened to sort primary particles with a mean size of 100 to 800 μm, in the same manner described above, in preparation for powder molding.

Fibrously extruded strands may be cut to a length of 1 mm or less in order to be used in the molding process.

Following the above preparation, slush molding is carried out using the elastomer composition. In molding process, the composition is dropped, primarily by gravitational force, into a mold heated to at least the melting point thereof. After a certain period, the mold is turned over, so that the excess of the composition is separated and deposited into a collection box. The composition in the mold is gradually melted to form into a skin layer. The resulting skin layer is cooled and removed from the mold. This process is repeated.

The mold is heated generally by oil circulation or in a hot blast stove. Oil circulation provides easy temperature control of the mold depending on piping configurations, but the mold is generally heated only from the surface thereof. In contrast, hot blast stoves provide heating from both the surface of the mold and the reverse face of the molded matter. Since the air in hot blast stoves is normally heated to 300° C. or more, steps must be taken so that thermal oxidation does not cause deterioration of the reverse face of the molded material.

Air heating is effective in multilayer (generally two or three layer) slush molding. That is, the first powder, which is to be an external layer, is slush-molded in the heated mold. The second powder is deposited on the semi-melted first layer. If necessary, the third slush molding step is carried out. The combined layers are heated and melted. In this case, heating only the mold surface does not provide sufficient heat transfer. Preferably, hot blast stoves are used, which cause the reverse face of the molded composition, as well as the mold surface, to be heated.

Figure 2:
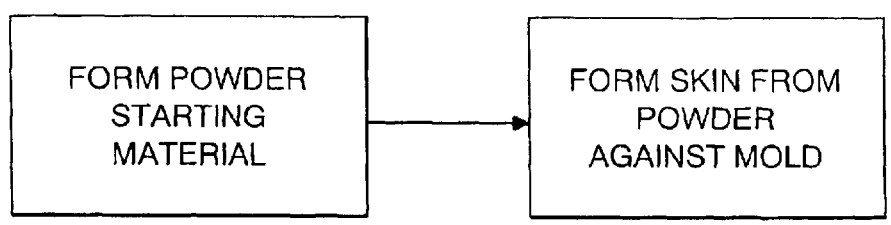
FIG. 2 is a schematic representation of a process for forming a powder starting material, according to the present invention, and forming the powder into a skin against a mold.

The performance of the present invention, compared to other powder slush molding materials and methods, is described in the following examples. The skins used for testing were made by first forming a powder starting material, and thereafter forming the skin with the powder material, as shown schematically in FIG. 2.

INVENTIVE EXAMPLE 1

COMPARATIVE EXAMPLES 1–6

In each of INVENTIVE EXAMPLE 1 and COMPARATIVE EXAMPLES 1 to 6, a polypropylene resin, a hydrogenated block copolymer, an elastomer, stabilizers, and a lubricant, as listed in Tables 1 and 2, below, were dry-blended with a tumbler.

TABLE 1

(Parts by mass)

| | INVENTIVE EXAMPLES | | | | | | |
|---|---|---|---|---|---|---|---|
| | 1 | 2 | 3 | 4 | 5 | 6 | 8 |
| Random PP-*1 | 50 | 45 | 50 | — | — | — | — |
| Flexible PP resin 1-*2 | — | — | — | — | — | 63 | 63 |
| Flexible PP resin 2-*3 | — | — | — | — | 50 | — | — |
| Homo PP *4 | — | — | — | 45 | 27 | — | — |
| (TPE) 1,2-SEB-*5 | 50 | (24) | (35) | (24) | (18) | (29) | (37) |
| EOR-*6 | — | 15 | 15 | 15 | — | — | — |
| Paraffin oil-*7 | — | (12) | — | (12) | (5) | (8) | — |
| Polyethylene-*8 | — | (4) | — | (4) | — | — | — |
| (Lubricant) Amide | 0.15 | 0.15 | — | 0.15 | 0.15 | 0.15 | 0.15 |
| Silicone oil | 0.6 | 0.60 | 0.60 | 0.60 | 0.60 | 0.60 | 0.60 |
| (Stabilizer) Anti-oxidant-*9 | 0.2 | (0.2) | (0.2) | (0.2) | (0.2) | (0.2) | (0.2) |
| Anti-oxidant-*10 | 0.2 | (0.2) | (0.2) | (0.2) | (0.2) | (0.2) | (0.2) |
| Photostabilizer-*11 | 0.15 | (0.15) | (0.15) | (0.15) | (0.15) | (0.15) | (0.15) |
| Photostabilizer-*12 | 0.15 | (0.15) | (0.15) | (0.15) | (0.15) | (0.15) | (0.15) |
| Organic peroxide-*13 | — | 0.45 | 0.45 | 0.45 | 0.45 | 0.60 | 0.60 |
| Tensile elongation (%) | 650 | 533 | 633 | 192 | 600 | 642 | 800 |
| Tensile strength (MPa) | 7.40 | 7.88 | 7.42 | 4.65 | 8.08 | 7.03 | 9.82 |
| MFR (g/10 min) *14 | 50 | 237 | 71 | 161 | 86 | 115 | 70 |
| Blushing | O | O | O | O | O | O | O |
| Sheet formability | O | O | O | O | O | O | O |
| Melted state of reverse face | O | O | O | O | O | O | O |

*1 Random PP XK0286 made by Chisso Corporation
*2 Flexible PP resin E-2700X made by Idemitsu Petrochemical
*3 Flexible PP resin E-2640 made by Idemitsu Petrochemical
*4 Homo PP K5360 made by Chisso Corporation
*5 Hydrogenated block copolymer Tuftec L-515 made by Asahi Chemical Industry
*6 Ethylene octene copolymer EG8407 made by DuPont Dow
*7 Fatty acid amide
*8 Masterbatch containing 50% silicone made by Dow Toray
*9 Phenolic anti-oxidant
*10 Phosphorous anti-oxidant PEP-36
*11 Ultraviolet absorber LA-31 made by Asahi Denka
*12 HALS LA-57 made by Asahi Denka
*13 Perhexa 25B-40 made by NOF Corporation
*14 230° C., 2.16 kgf

TABLE 2

(Parts by mass)

| | COMPARATIVE EXAMPLES | | | | | |
|---|---|---|---|---|---|---|
| | 1 | 2 | 3 | 4 | 5 | 6 |
| Random PP-*1 | 50 | 45 | 50 | 50 | 50 | — |
| (TPE) SEBS1-*15 | 50 | — | — | — | — | — |
| SEPS-*16 | — | 50 | — | — | — | — |
| SEBS2-*17 | — | — | 50 | — | — | — |
| EPR-*18 | — | — | — | 50 | — | — |
| EOR-*6 | — | — | — | — | 50 | — |
| Polymerized TPO-*19 | — | — | — | — | — | 100 |
| (Lubricant) Amide-*7 | 0.15 | 0.15 | 0.15 | 0.15 | 0.15 | 0.15 |
| Silicone oil-*8 | 0.6 | 0.60 | 0.60 | 0.60 | 0.60 | 0.60 |
| (Stabilizer) Anti-oxidant-*9 | 0.2 | 0.2 | 0.2 | 0.2 | 0.2 | 0.2 |
| Antioxidant-*10 | 0.2 | 0.2 | 0.2 | 0.2 | 0.2 | 0.2 |
| Photostabilizer-*11 | 0.15 | 0.15 | 0.15 | 0.15 | 0.15 | 0.15 |
| Photostabilizer-*12 | 0.15 | 0.15 | 0.15 | 0.15 | 0.15 | 0.15 |
| Tensile elongation (%) | 80 | 20 | not melted | non-sheet | 30 | 25 |
| Tensile strength (MPa) | 4.7 | 3.5 | melted | sheet | 6.1 | 2.86 |
| MFR (g/10 min)-*14 | 18 | 40 | 2 | — | 43 | 5 |
| Blushing | X | X | — | XX | X | O |
| Sheet formability | Δ | X | XX | XX | X | X |
| Melted state of reverse face | Δ | X | XX | XX | X | X |

*1 Random PP XK0286 made by Chisso Corporation
*6 Ethylene octene copolymer EG8407 made by DuPont Dow
*7 Fatty acid amide
*8 Masterbatch containing 50% silicone made by Dow Toray
*9 Phenolic anti-oxidant
*10 Phosphorous anti-oxidant PEP-36
*11 Ultraviolet absorber LA-31 made by Asahi Denka
*12 HALS LA-57 made by Asahi Denka

TABLE 2-continued

|  | (Parts by mass) COMPARATIVE EXAMPLES | | | | | |
|---|---|---|---|---|---|---|
|  | 1 | 2 | 3 | 4 | 5 | 6 |

*14 230° C., 2.16 kgf
*15 Tuftec H1052 (95% and more hydrogenated, containing 20%-styrene) made by Asahi Chemical Industry
*16 SEPTON 2002 made by Kuraray
*17 KRATON G1650 made by Shell Chemicals
*18 EPO2P made by JSR
*19 Zelas 5053 made by Mitsubishi Chemical Each mixture was delivered from a material supplying hopper of a biaxial extruder (PCM45 made by Ikegai Steel), was kneaded at 220° C. and 300 rpm, and subsequently extruded and formed into a pellet.

After the pellet was immersed in liquid nitrogen, it was pulverized in a turbo mill, T250-4J (made by TURBO KOGYO). The pulverized matter was sifted through a 1000 μm-sieve. The matter that passed through the sieve was collected.

INVENTIVE EXAMPLES 2–7

COMPARATIVE EXAMPLES 7–10

In each of INVENTIVE EXAMPLES 2–7 and COMPARATIVE EXAMPLES 7–10, components were kneaded twice with a biaxial extruder (PCM45 made by Ikegai Steel). Initially, polypropylene resin, an olefin resin, an ethylene octene copolymer (EOR), an organic peroxide, and a lubricant were dry-blended with a tumbler. Each dry-blended mixture from the biaxial extruder was kneaded at 230° C. and 100 rpm with a process oil supplied from a vent port, and extruded to form a pellet. A hydrogenated block copolymer, an elastomer, a polyethylene resin, and stabilizers, which are listed in Tables 1 to 3, were dry-blended using a tumbler, and supplied to the first formed pellet and kneaded therewith at 230° C. and 300 rpm.

TABLE 3

|  | (Parts by mass) COMPARATIVE EXAMPLES | | | |
|---|---|---|---|---|
|  | 7 | 8 | 9 | 10 |
| Random PP-*1 | 45 | 50 | 45 | 45 |
| (TPE)SEBS1-*15 | (24) | (35) | — | — |
| SEBS2-*17 | — | — | (24) | — |
| Homo PP *4 | — | — | — | 45 |
| EOR-*18 | — | — | — | (24) |
| EOR *6 | 15 | 15 | 15 | 15 |
| Paraffin oil | (12) | — | (12) | (12) |
| Polyethylene | (4) | — | (4) | (4) |
| (Lubricant) Amide-*7 | 0.15 | 0.15 | 0.15 | 0.15 |
| Silicone oil-*8 | 0.60 | 0.60 | 0.5 | 0.60 |
| (Stabilizer) Anti-oxidant-*9 | (0.2) | (0.2) | (0.2) | (0.2) |
| Anti-Oxidant-*10 | (0.2) | (0.2) | (0.2) | (0.2) |
| Photostabilizer-*11 | (0.15) | (0.15) | (0.15) | (0.15) |
| Photostabilizer-*12 | (0.15) | (0.15) | (0.15) | (0.15) |
| Organic peroxide-*13 | 0.45 | 0.45 | 0.45 | 0.45 |
| Tensile elongation (%) | 20 | 30 | non-sheet | non-sheet |
| Tensile strength (MPa) | 2.0 | 2.5 | | |
| MFR (g/10 min)-*14 | 200 | 80 | 40 | — |
| Blushing | X | X | — | — |
| Sheet formability | Δ | Δ | XX | XX |
| Melted state of reverse face | Δ | Δ | XX | XX |

*1 Random PP XK0286 made by Chisso Corporation
*6 Ethylene octene copolymer EG8407 made by DuPont Dow
*7 Fatty acid amide
*8 Masterbatch containing 50% silicone made by Dow Toray

TABLE 3-continued

|  | (Parts by mass) COMPARATIVE EXAMPLES | | | |
|---|---|---|---|---|
|  | 7 | 8 | 9 | 10 |

*9 Phenolic anti-oxidant
*10 Phosphorous anti-oxidant PEP-36
*11 Ultraviolet absorber LA-31 made by Asahi Denka
*12 HALS LA-57 made by Asahi Denka
*14 230° C., 2.16 kgf
*15 Tuftec H1052 (95% and more hydrogenated, containing 20%-styrene) made by Asahi Chemical Industry
*17 KRATON G1650 made by Shell Chemicals
*18 EP02P made by JSR Each mixture was extruded and formed into a pellet. The parenthetic materials in the tables are substances added in the second kneading step.

The pellet prepared according to the above was immersed in liquid nitrogen and pulverized in a turbo mill, T250-4J (made by TURBO KOGYO), and thereafter sifted through a 1000 μm-sieve. The powdery particles that passed through the sieve were collected.

The above-described powdery composition that was collected was molded in a slush molding process. The powder slush molding was carried out as follows. A board of 150 mm×150 mm×3 mm, having leather-like wrinkles, was heated to 250° C. in an oven. On the board, 800 g of the powdery composition was deposited, and allowed to remain in place for 10 minutes so as to stick to the board. Thereafter, the powder which was not melted or stuck to the board was removed. The remainder was heated in an oven at 300° C. for 60 seconds. The stuck powder taken out of the oven was then cooled. A skin 0.8 mm thick was removed from the board.

The melt viscosity of the above-described pellets, the formability of the slush-molded sheets, the melted states of the reverse faces of the sheets, the tensile properties of the skins, and the blushing arising from folding was evaluated. The results are shown in Tables 1 to 3.

For each melt viscosity, melt flow rate was measured at 230° C. and under a load of 2.16 kgf in accordance with JIS K7210.

For each sheet, formability was visually determined based on whether the sheet formed by the slush molding had been uniformly melted and whether it was shrunk. For each sheet where shrinkage was not observed, "O" is marked in the Tables. For each non-uniform sheet for which the evaluation was impossible because of a large amount of shrinkage, "xx" is marked. Further, "x" or "Δ" is marked depending on the degree of shrinkage.

The melting states of the reverse faces of the sheets were likewise evaluated. For each sheet with little melting observed, "xx" is marked on the Tables. For each sheet where slight melting was observed, "x" is marked. For each sheet where near melting was observed, "Δ" is marked.

Tensile strength and elongation were measured for each skin punched out with a JIS No. 3-dumbbell at a testing speed of 200 mm.

Blushing caused by folding the sheets was visually evaluated. "O" is marked in the Tables where no blushing was observed. "xx" is marked in the Tables where serious blushing was observed. "x" or "Δ" is marked depending on the degree of blushing. The results are shown in Tables 1 to 3.

As a result, the pellets of INVENTIVE EXAMPLES 1 to 7 had MFRs of 10 g/10 min and more, showing sufficient melt flowability and sheet formability. The reverse faces of the sheets also uniformly melted and no shrinkage thereof was observed. In contrast, the sheets of COMPARATIVE EXAMPLES 1 to 10 had poor sheet formability even though the MFRs were 10 g/10 min and more. The reverse faces of the sheets did not melt uniformly and shrinkage and irregularity were observed. In addition, pinholes and underfills were present, which is believed attributable to poor melting properties.

INVENTIVE EXAMPLES 8 TO 19

COMPARATIVE EXAMPLES 11 TO 17

In each of EXAMPLES 8 to 19 and COMPARATIVE EXAMPLES 11 to 17, components were kneaded twice with a biaxial extruder (PCM45 made by Ikegai Steel). First, as shown in Tables 4 to 7, polypropylene resin, an ethylene octane copolymer (EOR), an organic peroxide, and a lubricant were dry-blended using a tumbler.

TABLE 4

(Parts by mass)

| | INVENTIVE EXAMPLES | | | | | |
|---|---|---|---|---|---|---|
| | 8 | 9 | 10 | 11 | 12 | 13 |
| Random PP-*1 | 45 | 45 | 45 | 45 | 45 | 45 |
| (TPE) SEBS1-*2 | — | — | (35) | (20) | (25) | (37) |
| H-SBR1-*3 | (14) | (16) | — | — | — | — |
| H-SBR2-*4 | (14) | (8) | (10) | (9) | (12) | (10) |
| EOR-*5 | 15 | 15 | 10 | 10 | 10 | — |
| Paraffin oil-*6 | (12) | (12) | — | (12) | (8) | (8) |
| Polyethylene-*7 | — | (4) | — | (4) | — | — |
| (Lubricant) Amide | | | 0.15 | | | |
| Silicone oil | | | 0.6 | | | |
| (Stabilizer) Anti-oxidant | | | (0.4) | | | |
| Photostabilizer | | | (0.3) | | | |
| Organic peroxide-*8 | 0.45 | 0.45 | 0.45 | 0.45 | 0.45 | 0.45 |
| MFR (g/10 min)-*9 | 187 | 235 | 215 | 258 | 253 | 150 |
| Tensile elongation (%) at −35° C. | 424 | 378 | 224 | 361 | 246 | 236 |
| Tensile elongation (%) at 23° C. | 292 | 325 | 800 | 375 | 683 | 875 |
| Tensile elongation (%) at 80° C. | 142 | 350 | 378 | 173 | 205 | 858 |
| Tensile elongation (%) at 120° C. | 287 | 198 | 175 | 143 | 148 | 118 |
| Blushing | O | O | O | O | O | O |
| Sheet formability | O | O | O | O | O | O |
| Melted state of reverse face | O | O | O | O | O | O |

*1 Random PP, MFR = 27 g/10 min (230° C., 2.16 kgf), made by Chisso Corporation
*2 Hydrogenated block copolymer Tuftec L-515 made by Asahi Chemical Industry (95% and more hydrogenated, containing 12% styrene, 60 mol % and more 1, 2 bonding)
*3 DYNARON 2320P (hydrogenated random co-polymer) made by JSR (95% and more hydrogenated, containing 10% styrene, 60 mol % and more 1, 2 bonding)
*4 DYNARON 2324P (Hydrogenated random copolymer) made by JSR (95% and more hydrogenated, containing 16% styrene, 60 mol % and more 1, 2 bonding)
*5 Ethylene octane copolymer EG8407 made by DuPont Dow
*6 Paraffin oil
*7 Polyethylene (LLDPE)
*8 Perhexa 25B-40 made by NOF Corporation
*9 230° C., 2.16 kgf

TABLE 5

(Parts by mass)

| | INVENTIVE EXAMPLES | | | | | |
|---|---|---|---|---|---|---|
| | 14 | 15 | 16 | 17 | 18 | 19 |
| (PP) Random PP1-1* | — | 45 | 45 | — | 45 | 45 |
| Random PP2-*10 | 45 | — | — | 45 | — | — |
| (TPE) SEBS1-*2 | (37) | (10) | (24) | (25) | (33) | (47) |
| H-SBR2-*4 | (10) | (37) | (23) | (12) | — | — |
| SEBR2-*11 | — | — | — | — | (14) | — |
| EOR-*5 | — | — | — | 10 | — | — |
| Paraffin oil-*6 | (8) | (8) | (8) | (8) | (8) | (8) |
| (Lubricant) Amide | | | 0.15 | | | |
| Silicone oil | | | 0.60 | | | |
| (Stabilizer) Anti-oxidant | | | (0.4) | | | |
| Photostabilizer | | | (0.3) | | | |
| Organic peroxide-*8 | 0.45 | 0.45 | 0.45 | 0.45 | 0.45 | 0.45 |
| MFR (g/10 min)-*9 | 146 | 233 | 195 | 138 | 140 | 237 |
| Tensile elongation (%) at −35° C. | 353 | 412 | 382 | 347 | 383 | 81 |
| Tensile elongation (%) at 23° C. | 842 | 525 | 700 | 700 | 533 | 517 |
| Tensile elongation (%) at 80° C. | 764 | 171 | 194 | 120 | 163 | 594 |
| Tensile elongation (%) at 120° C. | 101 | 178 | 154 | 148 | 137 | 60 |
| Blushing | O | O | O | O | O | O |

TABLE 5-continued

|  | INVENTIVE EXAMPLES (Parts by mass) | | | | | |
|---|---|---|---|---|---|---|
|  | 14 | 15 | 16 | 17 | 18 | 19 |
| Sheet formability | O | O | O | O | O | O |
| Melted state of reverse face | O | O | O | O | O | O |

*1 Random PP, MFR = 27 g/10 min (230° C., 2.16 kgf), made by Chisso Corporation
*2 Hydrogenated block copolymer Tuftec L-515 Made by Asahi Chemical Industry (95% and more hydrogenated, containing 12% styrene, 60 mol % and more 1, 2, bonding)
*4 DYNARON 2324P (hydrogenated random copolymer) made by JSR (95% and more hydrogenated, containing 16% styrene, 60 mol % and more 1, 2 bonding)
*5 Ethylene octene copolymer EG8407 made by DuPont Dow
*6 Paraffin oil
*8 Perhexa 25B-40 made by NOF Corporation
*9 230° C., 2.16 kgf
*10 Random PP MFR = 27 g/10 min (230° C., 2.16 kgf) made by Chisso Corporation
*11 Tuftec H1062 made by Asahi Chemical Industry (95% and more hydrogenated, containing 18% styrene)

TABLE 6

|  | COMPARATIVE EXAMPLES (Parts by mass) | | |
|---|---|---|---|
|  | 11 | 12 | 13 |
| (PP) Random PP1-*1 | 45 | — | 45 |
| Random PP2-*10 | — | 45 | — |
| (TPE)SEBS1-*2 | — | — | — |
| H-SBR1-*3 | (24) | (24) | (47) |
| SEBR2-*11 | — | — | — |
| EOR *5 | 15 | 15 | — |
| Paraffin oil-*6 | (12) | (12) | (8) |
| Polyethylene-*7 | (4) | (4) | — |
| (Lubricant) Amide |  | 0.15 |  |
| Silicone oil |  | 0.60 |  |
| (Stabilizer) Anti-oxidant |  | (0.4) |  |
| Photostabilizer |  | (0.3) |  |
| Organic peroxide-*8 | 0.45 | 0.45 | 0.45 |
| MFR (g/10 min)-*9 | 170 | 219 | 182 |
| Tensile elongation (%) at −35° C. | 51 | 385 | 224 |
| Tensile elongation (%) at 23° C. | 675 | 558 | 500 |
| Tensile elongation (%) at 80° C. | 451 | 100 | 546 |
| Tensile elongation (%) at 120° C. | 20 | 70 | 80 |
| Blushing | O | O | O |
| Sheet formability | O | O | O |
| Melted state of reverse face | O | O | O |

*1 Random PP, MFR = 27 g/10 min (230° C., 2.16 kgf), made by Chisso Corporation
*2 Hydrogenated block copolymer Tuftec L-515 made by Asahi Chemical Industry (95% and more hydrogenated, containing 12% styrene, 60 mol % and more 1, 2 bonding)
*3 DYNARON 2320P (hydrogenated random copolymer) made by JSR (95% and more hydrogenated, containing 10% styrene, 60 mol % and more 1, 2 bonding)
*5 Ethylene octene copolymer EG8407 made by DuPont Dow
*6 Paraffin oil
*7 Polyethylene (LLDPE)
*8 Perhexa 25B-40 made by NOF Corporation
*9 230° C., 2.16 kgf
*10 Random PP MFR = 27 g/10 min (230° C., 2.16 kgf) made by Chisso Corporation

TABLE 7

|  | COMPARATIVE EXAMPLES (Parts by mass) | | | |
|---|---|---|---|---|
|  | 14 | 15 | 16 | 17 |
| (PP) Random PP1-*1 | 45 | 50 | 45 | 45 |
| (TPE)SEBR3-*12 | (24) | (35) | — | — |
| SEBR4-*13 | — | — | (24) | — |
| EPR-*14 | — | — | — | (24) |
| EOR-*5 | 15 | 15 | 15 | 15 |
| Paraffin oil-*6 | (12) | — | (12) | (12) |
| Polyethylene-*7 | (4) | — | (4) | (4) |
| (Lubricant) Amide |  | 0.15 |  |  |
| Silicone oil |  | 0.60 |  |  |
| (Stabilizer) Anti-oxidant |  | (0.4) |  |  |
| photostabilizer |  | (0.3) |  |  |
| Organic peroxide *8 | 0.45 | 0.45 | 0.45 | 0.45 |
| MFR (g/10 min) *9 | 200 | 80 | 40 | — |
| Tensile elongation (%) at 23° C. | 20 | 30 | non-sheet | non-sheet |
| Blushing | X | X | — | — |
| Sheet formability | Δ | Δ | XX | XX |
| Melted state of reverse face | Δ | Δ | XX | XX |

*1 Random PP, MFR = 27 g/10 min (230° C., 2.16 kgf), made by Chisso Corporation
*5 Ethylene octene copolymer EG8407 made by DuPont Dow
*6 Paraffin oil
*8 Perhexa 25B-40 made by NOF Corporation
*9 230° C., 2.16 kgf
*12 Tuftec H1052 made by Asahi Chemical Industry (95% and more hydrogenated, containing 20% styrene)
*13 KRATON G1650 made by Shell Chemicals (95% and more hydrogenated, containing 29% styrene)
*14 EP02P made by JSR Each dry-blended mixture from the material supply hopper of the biaxial extruder was kneaded at 230° C. and 100 rpm, and thereafter extruded and formed into a pellet.

Thereafter, a hydrogenated block copolymer, a hydogenated random copolymer, a hydrogenated block, or random copolymer of styrene and conjugated diene, an elastomer, a polyethylene resin, and stabilizers were dry-blended in a tumbler, and then supplied to the pellet formed by the first kneading process and kneaded therewith at 230° C. and 300 rpm. Each mixture was extruded and formed into a pellet. The materials in parenthesis in the Tables are substances added during the second kneading process.

The pellets, as formed above, were pulverized in a turbo mill, T-250-4J (made by TURBO KOGYO), and thereafter sifted through a 1000 μm-sieve. The primary powder particles that passed through the sieve were collected.

The above-described collected powdery compositions were each formed into skin 0.8 mm thick by slush molding in the same manner as described for

INVENTIVE EXAMPLE 1.

The melt viscosity of the above-described pellet, formability of the sheet formed by slush molding, the melted state of the reverse face of the sheet, the tensile property of the skin at certain temperatures, and blushing arising from folding a formed sheet were evaluated in the same manner as described above for INVENTIVE EXAMPLE 1. The results are shown in Tables 4 to 7.

The pellets of INVENTIVE EXAMPLES 8 to 19 had MFRs of 10 g/10 min and more, thus showing good melt flowability and sheet formability. The reverse faces of the sheets also uniformly melted and no shrinkage thereof was observed. The tensile elongation was 100% and more at ambient temperatures of −35 to 120° C., showing relatively little property variation arising from temperature changes. Hence, these compositions are suitable for use in forming skins for, among other things, covers of airbag storage boxes.

In contrast, while the pellets of COMPARATIVE EXAMPLES 11 to 13 had MFRs of 10 g/10 min and more, showing sufficient melt flowability and sheet formability and no shrinkage, the tensile elongation thereof was 100% and less at an ambient temperature of 120° C. In addition, COMPARATIVE EXAMPLE 11 had a tensile elongation of 100% or less even at an ambient temperature of −35° C. Thus, these compositions are generally not suitable to be used to form skins useable as covers for airbag storage boxes.

COMPARATIVE EXAMPLES 14 to 17 showed poor sheet formability even though they had MFRs of 10 g/10 min and more. Shrinkage and irregularity caused by non-uniform melting were observed on the reverse faces. Further, these sheets had pinholes and underfills attributable to poor melting. Thus, these compositions generally are not suitable to be used as thermoplastic elastomers for slush molding certain products.

INVENTIVE EXAMPLES 20 TO 22

The components of Table 8 were kneaded twice with a biaxial extruder (PCM45 made by Ikegai Steel).

TABLE 8

| | (Parts by mass) INVENTIVE EXAMPLES | | |
|---|---|---|---|
| | 20 | 21 | 22 |
| Polypropylene-ethylene copolymer | | | |
| CS-3650-*1 | — | 45 | — |
| PS-4918-*2 | 50 | — | 45 |
| H-SBR-*3 | — | — | (14) |
| 1.2-SEB-*4 | 35 | (24) | (10) |
| EOR-*5 | 15 | 15 | 15 |
| Paraffin oil | — | (12) | (12) |
| Polyethylene | — | (4) | (4) |
| Amide-containing lubricant | 0.15 | 0.15 | 0.15 |
| Silicone oil M.B | 0.6 | 0.6 | 0.6 |
| Phenolic anti-oxidant-*6 | 0.2 | (0.2) | (0.2) |
| Phosphorous anti-oxidant | 0.2 | (0.2) | (0.2) |
| Ultraviolet absorber | 0.15 | (0.15) | (0.15) |
| Photostabilizer HALS | 0.15 | (0.15) | (0.15) |
| Organic peroxide-*7 | — | 0.45 | 0.45 |
| MFR (g/10 min)-*8 | 73 | 210 | 205 |
| Tensile elongation (%) | 480 | 585 | 525 |
| Tensile strength (MPa) | 6.8 | 6.7 | 6.6 |
| Fold blushing | ◯ | ◯ | ◯ |
| Sheet face pinhole | ◯ | ◯ | ◯ |
| Melted state of reverse face | Δ | ◯ | ◯ |

TABLE 8-continued

| | (Parts by mass) INVENTIVE EXAMPLES | | |
|---|---|---|---|
| | 20 | 21 | 22 |

*1 Propylene-ethylene copolymer (mp = 131° C.) made by Chisso Corporation
*2 Propylene-ethylene copolymer (mp = 135° C.) made by Chisso Corporation
*3 DYNARON H-2320P made by JSR
*4 Tuftec L-515 made by Asahi Chemical Industry
*5 Ethylene-octene copolymer made by DuPont Dow
*6 Masterbatch containing 50% silicone made by Dow Toray
*7 Perhexa 25B-40 made by NOF Corporation
*8 Measurement condition: 230° C., 2.16 kgf First, as shown in this Table, a propylene-α-olefin copolymer, an olefin resin, an ethylene octene copolymer (EOR), an organic peroxide, and a lubricant were dry-blended using a tumbler. The dry-blended mixtures from the material supply hopper of an extruder were kneaded at 230° C. and 100 rpm with a process oil infused through a vent port, and thereafter extruded and formed into a pellet. Then, an elastomer, polyethylene resin, and stabilizers, which are shown in Table 8, were dry-blended in a tumbler and subsequently supplied to the pellet formed by the first kneading process and kneaded at 230° C. and 300 rpm. Each mixture was extruded and formed into a pellet. The materials in parenthesis in the Table are substances added during the second kneading process.

The pellets formed according to the above were immersed in liquid nitrogen, pulverized in a turbo mill, T250-4J (made by TURBO KOGYO), and then sifted through a 1000 μm-sieve. The powdery particles that passed through the sieve were collected.

The above-described, collected, powdery compositions were each formed into a skin 0.8 mm thick by slush molding in the same manner as described for

INVENTIVE EXAMPLE 1.

The melt viscosity of the above-described pellets, existence of pinholes in the face of the sheet formed by slush molding, melted state of the reverse face of the sheet, the tensile property of the skin, and blushing arising from folding the sheets, were evaluated. The results are shown in Table 8.

The pinholes were evaluated in terms of the size and the number thereof by visually observing the sheet faces. "◯" is marked in the Table for each favorable sheet. "xx" is marked for each non-uniform sheet for which the evaluation was impossible because of a large amount of shrinkage. "x" or "Δ" is marked depending on the degree of pinhole formation.

The pellets of INVENTIVE EXAMPLES 20 to 22 had MFRs of 10 g/10 min and more, showing adequate melt flowability and favorable sheet formability. The reverse faces of the sheets also uniformly melted, and no shrinkage thereof was observed.

Generally, it has been shown that the invention provides thermoplastic elastomer compositions for a powder material suitable for slush molding. The thermoplastic elastomer composition contains a hydrogenated block copolymer compatible with a polypropylene resin. The compositions and powders according to the invention can be made with good flowability and formability. Skins can be made according to the invention with good shrinkage characteristics, good transparency, good physical properties, and good appearance owing to the control of blushing at fold locations. Further, the skins may be made to have stable properties within a normal environmental temperature range.

The foregoing disclosure of specific embodiments is intended to be illustrative of the broad concepts comprehended by the invention.

What is claimed is:

1. A thermoplastic elastomer composition for a powder material used for slush molding, said thermoplastic elastomer composition comprising:
   a polypropylene resin; and
   20 to 500 parts by mass of a hydrogenated block copolymer per 100 parts by mass of the polypropylene resin,
   the hydrogenated block copolymer comprising a) at least one polymer block A with a primary component comprising a vinyl aromatic hydrocarbon monomer unit and b) at east one polymer block B with a primary component comprising a hydrogenated butadiene monomer unit,
   the polymer block B having a hydrogenation degree of at least 90%,
   the vinyl aromatic hydrocarbon in the hydrogenated block copolymer present in an amount more than 5 mass % and less than 25 mass %,
   the polymer block B before hydrogenation containing 62 mol % or more 1, 2 bonds on average,
   wherein the melt flow rate (MFR) of the thermoplastic elastomer composition is at least 10 g/10 min at 230° C. under a load of 2.16 kgf in accordance with Japanese Industrial Standards (JIS) K7210.

2. The thermoplastic elastomer composition for a powder material used for slush molding according to claim 1 further comprising 20 to 200 parts by mass per 100 parts by mass of the polypropylene resin of at least one of a) a block arid b) a random copolymer of styrene and a conjugated diene with a hydrogenation rate of at least 90%, the styrene being present in the at least one of the a) block and b) random copolymer of styrene and a conjugated diene in an amount more than 14 mass % and less than 50 mass %.

3. The thermoplastic elastomer composition for a powder material used for slush molding according to claim 1 further comprising 5 to 250 parts by mass of an ethylene-α-olefin copolymer rubber per 100 parts by mass of the hydrogenated block copolymer.

4. The thermoplastic elastomer composition for a powder material used for slush molding according to claim 2 further comprising 5 to 250 parts by mass of an ethylene-α-olefin copolymer rubber per 100 parts by mass of the hydrogenated block copolymer.

5. The thermoplastic elastomer composition for a powder material used for slush molding according to claim 1 wherein the polypropylene resin comprises a propylene-α-olefin copolymer having a melting point of 120° to 145° C. measured with a differential calorimeter at a heating rate of 5° C./min.

6. The thermoplastic elastomer composition for a powder material used for slush molding according to claim 2 wherein the polypropylene resin comprises a propylene-α-olefin copolymer having a melting point of 120° to 145° C. measured with a differential colorimeter at a heating rate of 5°C./min.

7. The thermoplastic elastomer composition for a powder material used for slush molding according to claim 3 wherein the polypropylene resin comprises a propylene-α-olefin copolymer having a melting point of 120° to 145° C. measured with a differential colorimeter at a heating rate of 5° C./min.

8. The thermoplastic elastomer composition for a powder material used for slush molding according to claim 4 wherein the polypropylene resin comprises a propylene-α-olefin copolymer having a melting point of 120° to 145° C. measured with a differential colorimeter at a heating rate of 5° C./min.

9. The thermoplastic elastomer composition for a powder material used for slush molding according to claim 1 further comprising 0.02 to 5.0 parts by mass of an organic peroxide per 100 parts by mass of the polypropylene resin.

10. The thermoplastic elastomer composition for a powder material used for slush molding according to claim 2 further comprising 0.02 to 5.0 parts by mass of an organic peroxide per 100 parts by mass of the polypropylene resin.

11. The thermoplastic elastomer composition for a powder material used for slush molding according to claim 3 further comprising 0.02 to 5.0 parts by mass of an organic peroxide per 100 parts by mass of the polypropylene resin.

12. The thermoplastic elastomer composition for a powder material used for slush molding according to claim 4 further comprising 0.02 to 5.0 parts by mass of an organic peroxide per 100 parts by mass of the polypropylene resin.

13. The thermoplastic elastomer composition for a powder material used for slush molding according to claim 5 further comprising 0.02 to 5.0 parts by mass of an organic peroxide 100 parts by mass of the polypropylene resin.

14. The thermoplastic elastomer composition for a powder material used for slush molding according to claim 6 further comprising 0.02 to 5.0 parts by mass of an organic peroxide 100 parts by mass of the polypropylene resin.

15. The thermoplastic elastomer composition for a powder material used for slush molding according to claim 7 further comprising 0.02 to 5.0 parts by mass of an organic peroxide 100 parts by mass of the polypropylene resin.

16. The thermoplastic elastomer composition for a powder material used for slush molding according to claim 8 further comprising 0.02 to 5.0 parts by mass of an organic peroxide 100 parts by mass of the polypropylene resin.

17. The thermoplastic elastomer composition for a powder material used for slush molding according to claim 1 further comprising a process oil.

18. The thermoplastic elastomer composition for a powder material used for slush molding according to claim 2 further comprising a process oil.

19. The thermoplastic elastomer composition for a powder material used for slush molding according to claim 3 further comprising a process oil.

20. The thermoplastic elastomer composition for a powder material used for slush molding according to claim 4 further comprising a process oil.

21. The thermoplastic elastomer composition for a powder material used for slush molding according to claim 5 further comprising a process oil.

22. The thermoplastic elastomer composition for a powder material used for slush molding according to claim 6 further comprising a process oil.

23. The thermoplastic elastomer composition for a powder material used for slush molding according to claim 7 further comprising a process oil.

24. The thermoplastic elastomer composition for a powder material used for slush molding according to claim 8 further comprising a process oil.

25. The thermoplastic elastomer composition for a powder material used for slush molding according to claim 9 further comprising a process oil.

26. The thermoplastic elastomer composition for a powder material used for slush molding according to claim 10 further comprising a process oil.

27. The thermoplastic elastomer composition for a powder material used for slush molding according to claim 11 further comprising a process oil.

28. The thermoplastic elastomer composition for a powder material used for slush molding according to claim 12 further comprising a process oil.

29. The thermoplastic elastomer composition for a powder material used for slush molding according to claim 13 further comprising a process oil.

30. The thermoplastic elastomer composition for a powder material used for slush molding according to claim 14 further comprising a process oil.

31. The thermoplastic elastomer composition for a powder material used for slush molding according to claim 15 further comprising a process oil.

32. The thermoplastic elastomer composition for a powder material used for slush molding according to claim 16 further comprising a process oil.

33. The thermoplastic elastomer composition for a powder material used for slush molding according to claim 1 wherein the thermoplastic elastomer composition is freeze-pulverized to produce particles having a size to pass through a sieve not greater than 1.00 mm.

34. The thermoplastic elastomer composition for a powder material used for slush molding according to claim 2 wherein the thermoplastic elastomer composition is freeze-pulverized to produce particles having a size to pass through a sieve not greater than 1.00 mm.

35. The thermoplastic elastomer composition for a powder material used for slush molding according to claim 3 wherein the thermoplastic elastomer composition is freeze-pulverized to produce particles having a size to pass through a sieve not greater than 1.00 mm.

36. The thermoplastic elastomer composition for a powder material used for slush molding according to claim 4 wherein the thermoplastic elastomer composition is freeze-pulverized to produce particles having a size to pass through a sieve not greater than 1.00 mm.

37. The thermoplastic elastomer composition for a powder material used for slush molding according to claim 5 wherein the thermoplastic elastomer composition is freeze-pulverized to produce particles having a size to pass through a sieve not greater than 1.00 mm.

38. The thermoplastic elastomer composition for a powder material used for slush molding according to claim 6 wherein the thermoplastic elastomer composition is freeze-pulverized to produce particles having a size to pass through a sieve not greater than 1.00 mm.

39. The thermoplastic elastomer composition for a powder material used for slush molding according to claim 7 wherein the thermoplastic elastomer composition is freeze-pulverized to produce particles having a size to pass through a sieve not greater than 1.00 mm.

40. The thermoplastic elastomer composition for a powder material used for slush molding according to claim 8 wherein the thermoplastic elastomer composition is freeze-pulverized to produce particles having a size to pass through a sieve not greater than 1.00 mm.

41. The thermoplastic elastomer composition for a powder material used for slush molding according to claim 9 wherein the thermoplastic elastomer composition is freeze-pulverized to produce particles having a size to pass through a sieve not greater than 1.00 mm.

42. The thermoplastic elastomer composition for a powder material used for slush molding according to claim 10 wherein the thermoplastic elastomer composition is freeze-pulverized to produce particles having a size to pass through a sieve not greater than 1.00 mm.

43. The thermoplastic elastomer composition for a powder material used for slush molding according to claim 11 wherein the thermoplastic elastomer composition is freeze-pulverized to produce particles having a size to pass through a sieve not greater than 1.00 mm.

44. The thermoplastic elastomer composition for a powder material used for slush molding according to claim 12 wherein the thermoplastic elastomer composition is freeze-pulverized to produce particles having a size to pass through a sieve not greater than 1.00 mm.

45. The thermoplastic elastomer composition for a powder material used for slush molding according to claim 13 wherein the thermoplastic elastomer composition is freeze-pulverized to produce particles having a size to pass through a sieve not greater than 1.00 mm.

46. The thermoplastic elastomer composition for a powder material used for slush molding according to claim 14 wherein the thermoplastic elastomer composition is freeze-pulverized to produce particles having a size to pass through a sieve not greater than 1.00 mm.

47. The thermoplastic elastomer composition for a powder material used for slush molding according to claim 15 wherein the thermoplastic elastomer composition is freeze-pulverized to produce particles having a size to pass through a sieve not greater than 1.00 mm.

48. The thermoplastic elastomer composition for a powder material used for slush molding according to claim 16 wherein the thermoplastic elastomer composition is freeze-pulverized to produce particles having a size to pass through a sieve not greater than 1.00 mm.

49. The thermoplastic elastomer composition for a powder material used for slush molding according to claim 17 wherein the thermoplastic elastomer composition is freeze-pulverized to produce particles having a size to pass through a sieve not greater than 1.00 mm.

50. The thermoplastic elastomer composition for a powder material used for slush molding according to claim 18 wherein the thermoplastic elastomer composition is freeze-pulverized to produce particles having a size to pass through a sieve not greater than 1.00 mm.

51. The thermoplastic elastomer composition for a powder material used for slush molding according to claim 19 wherein the thermoplastic elastomer composition is freeze-pulverized to produce particles having a size to pass through a sieve not greater than 1.00 mm.

52. The thermoplastic elastomer composition for a powder material used for slush molding according to claim 20 wherein the thermoplastic elastomer composition is freeze-pulverized to produce particles having a size to pass through a sieve not greater than 1.00 mm.

53. The thermoplastic elastomer composition for a powder material used for slush molding according to claim 21 wherein the thermoplastic elastomer composition is freeze-pulverized to produce particles having a size to pass through a sieve not greater than 1.00 mm.

54. The thermoplastic elastomer composition for a powder material used for slush molding according to claim 22 wherein the thermoplastic elastomer composition is freeze-pulverized to produce particles having a size to pass through a sieve not greater than 1.00 mm.

55. The thermoplastic elastomer composition for a powder material used for slush molding according to claim 23 wherein the thermoplastic elastomer composition is freeze-pulverized to produce particles having a size to pass through a sieve not greater than 1.00 mm.

56. The thermoplastic elastomer composition for a powder material used for slush molding according to claim 24 wherein the thermoplastic elastomer composition is freeze-pulverized to produce particles having a size to pass through a sieve not greater than 1.00 mm.

57. The thermoplastic elastomer composition for a powder material used for slush molding according to claim 25 wherein the thermoplastic elastomer composition is freeze-pulverized to produce particles having a size to pass through a sieve not greater than 1.00 mm.

58. The thermoplastic elastomer composition for a powder material used for slush molding according to claim 26 wherein the thermoplastic elastomer composition is freeze-pulverized to produce particles having a size to pass through a sieve not greater than 1.00 mm.

59. The thermoplastic elastomer composition for a powder material used for slush molding according to claim 27 wherein the thermoplastic elastomer composition is freeze-pulverized to produce particles having a size to pass through a sieve not greater than 1.00 mm.

60. The thermoplastic elastomer composition for a powder material used for slush molding according to claim 28 wherein the thermoplastic elastomer composition is freeze-pulverized to produce particles having a size to pass through a sieve not greater than 1.00 mm.

61. The thermoplastic elastomer composition for a powder material used for slush molding according to claim 29 wherein the thermoplastic elastomer composition is freeze-pulverized to produce particles having a size to pass through a sieve not greater than 1.00 mm.

62. The thermoplastic elastomer composition for a powder material used for slush molding according to claim 30 wherein the thermoplastic elastomer composition is freeze-pulverized to produce particles having a size to pass through a sieve not greater than 1.00 mm.

63. The thermoplastic elastomer composition for a powder material used for slush molding according to claim 31 wherein the thermoplastic elastomer composition is freeze-pulverized to produce particles having a size to pass through a sieve not greater than 1.00 mm.

64. The thermoplastic elastomer composition for a powder material used for slush molding according to claim 32 wherein the thermoplastic elastomer composition is freeze-pulverized to produce particles having a size to pass through a sieve not greater than 1.00 mm.

65. The thermoplastic elastomer composition for a powder material used for slush molding according to claim 1 wherein the thermoplastic elastomer composition is treated by hot-culling in water to produce particles having an effective mean diameter of 1.00 mm or less.

66. The thermoplastic elastomer composition for a powder material used for slush molding according to claim 2 wherein the thermoplastic elastomer composition is treated by hot-culling in water to produce particles having an effective mean diameter of 1.00 mm or less.

67. The thermoplastic elastomer composition for a powder material used for slush molding according to claim 3 wherein the thermoplastic elastomer composition is treated by hot-cutting in water to produce particles having an effective mean diameter of 1.00 mm or less.

68. The thermoplastic elastomer composition for a powder material used for slush molding according to claim 4 wherein the thermoplastic elastomer composition is treated by hot-cutting in water to produce particles having an effective mean diameter of 1.00 mm or less.

69. The thermoplastic elastomer composition for a powder material used for slush molding according to claim 5 wherein the thermoplastic elastomer composition is treated by hot-culling in water to produce particles having an effective mean diameter of 1.00 mm or less.

70. The thermoplastic elastomer composition for a powder material used for slush molding according to claim 6 wherein the thermoplastic elastomer composition is treated by hot-cutting in water to produce particles having an effective mean diameter of 1.00 mm or less.

71. The thermoplastic elastomer composition for a powder material used for slush molding according to claim 7 wherein the thermoplastic elastomer composition is treated by hot-cutting in water to produce particles having an effective mean diameter of 1.00 mm or less.

72. The thermoplastic elastomer composition for a powder material used for slush molding according to claim 8 wherein the thermoplastic elastomer composition is treated by hot-cutting in water to produce particles having an effective mean diameter of 1.00 mm or less.

73. The thermoplastic elastomer composition for a powder material used for slush molding according to claim 9 wherein the thermoplastic elastomer composition is treated by hot-cutting in water to produce particles having an effective mean diameter of 1.00 mm or less.

74. The thermoplastic elastomer composition for a powder material used for slush molding according to claim 10 wherein the thermoplastic elastomer composition is treated by hot-cutting in water to produce particles having an effective mean diameter of 1.00 mm or less.

75. The thermoplastic elastomer composition for a powder material used for slush molding according to claim 11 wherein the thermoplastic elastomer composition is treated by hot-cutting in water to produce particles having an effective mean diameter of 1.00 mm or less.

76. The thermoplastic elastomer composition for a powder material used for slush molding according to claim 12 wherein the thermoplastic elastomer composition is treated by hot-cutting in water to produce particles having an effective mean diameter of 1.00 mm or less.

77. The thermoplastic elastomer composition for a powder material used for slush molding according to claim 13 wherein the thermoplastic elastomer composition is treated by hot-cutting in water to produce particles having an effective mean diameter of 1.00 mm or less.

78. The thermoplastic elastomer composition for a powder material used for slush molding according to claim 14 wherein the thermoplastic elastomer composition is treated by hot-cutting in water to produce particles having an effective mean diameter of 1.00 mm or less.

79. The thermoplastic elastomer composition for a powder material used for slush molding according to claim 15 wherein the thermoplastic elastomer composition is treated by hot-cutting in water to produce particles having an effective mean diameter of 1.00 mm or less.

80. The thermoplastic elastomer composition for a powder material used for slush molding according to claim 16 wherein the thermoplastic elastomer composition is treated by hot-cutting in water to produce particles having an effective mean diameter of 1.00 mm or less.

81. The thermoplastic elastomer composition for a powder material used for slush molding according to claim 17 wherein the thermoplastic elastomer composition is treated by hot-cutting in water to produce particles having an effective mean diameter of 1.00 mm or less.

82. The thermoplastic elastomer composition for a powder material used for slush molding according to claim 18 wherein the thermoplastic elastomer composition is treated by hot-cutting in water to produce particles having an effective mean diameter of 1.00 mm or less.

83. The thermoplastic elastomer composition for a powder material used for slush molding according to claim 19 wherein the thermoplastic elastomer composition is treated by hot-cutting in water to produce particles having an effective mean diameter of 1.00 mm or less.

84. The thermoplastic elastomer composition for a powder material used for slush molding according to claim 20 wherein the thermoplastic elastomer composition is treated by hot-cutting in water to produce particles having an effective mean diameter of 1.00 mm or less.

85. The thermoplastic elastomer composition for a powder material used for slush molding according to claim 21 wherein the thermoplastic elastomer composition is treated by hot-cutting in water to produce particles having an effective mean diameter of 1.00 mm or less.

86. The thermoplastic elastomer composition for a powder material used for slush molding according to claim 22 wherein the thermoplastic elastomer composition is treated by hot-cutting in water to produce particles having an effective mean diameter of 1.00 mm or less.

87. The thermoplastic elastomer composition for a powder material used for slush molding according to claim 23 wherein the thermoplastic elastomer composition is treated by hot-cutting in water to produce particles having an effective mean diameter of 1.00 mm or less.

88. The thermoplastic elastomer composition for a powder material used for slush molding according to claim 24 wherein the thermoplastic elastomer composition is treated by hot-cutting in water to produce particles having an effective mean diameter of 1.00 mm or less.

89. The thermoplastic elastomer composition for a powder material used for slush molding according to claim 25 wherein the thermoplastic elastomer composition is treated by hot-cutting in water to produce particles having an effective mean diameter of 1.00 mm or less.

90. The thermoplastic elastomer composition for a powder material used for slush molding according to claim 26 wherein the thermoplastic elastomer composition is treated by hot-cutting in water to produce particles having an effective mean diameter of 1.00 mm or less.

91. The thermoplastic elastomer composition for a powder material used for slush molding according to claim 27 wherein the thermoplastic elastomer composition is treated by hot-cutting in water to produce particles having an effective mean diameter of 1.00 mm or less.

92. The thermoplastic elastomer composition for a powder material used for slush molding according to claim 28 wherein the thermoplastic elastomer composition is treated by hot-cutting in water to produce particles having an effective mean diameter of 1.00 mm or less.

93. The thermoplastic elastomer composition for a powder material used for slush molding according to claim 29 wherein the thermoplastic elastomer composition is treated by hot-cutting in water to produce particles having an effective mean diameter of 1.00 mm or less.

94. The thermoplastic elastomer composition for a powder material used for slush molding according to claim 30 wherein the thermoplastic elastomer composition is treated by hot-cutting in water to produce particles having an effective mean diameter of 1.00 mm or less.

95. The thermoplastic elastomer composition for a powder material used for slush molding according to claim 31 wherein the thermoplastic elastomer composition is treated by hot-cutting in water to produce particles having an effective mean diameter of 1.00 mm or less.

96. The thermoplastic elastomer composition for a powder material used for slush molding according to claim 32 wherein the thermoplastic elastomer composition is treated by hot-cutting in water to produce particles having an effective mean diameter of 1.00 mm or less.

97. A thermoplastic elastomer composition for a powder material used for slush molding, said thermoplastic elastomer composition comprising:
 a polypropylene resin;
 20 to 300 parts by mass of a random copolymer of styrene and a conjugated diene 100 parts by mass of the polypropylene resin,
 the random copolymer having a hydrogenation degree of at least 90%,
 the styrene being present in an amount of more than 5 mass % and less than 14 mass %,
 the conjugated diene comprising at least 60 mol % of one of a) 1, 2 or b) 3, 4 bonds on average; and
 20 to 200 parts by mass of at least one of a) a block and b) a random copolymer of styrene and a conjugated diene 100 parts by mass of the polypropylene resin and having a hydrogenation degree of at least 90%,
 the styrene being present in at least one of the a) block and b) random copolymer of styrene and a conjugated diene in an amount more than 14 mass % and less than 50 mass %
 wherein the melt flow rate (MFR) of the thermoplastic elastomer composition is at least 10 g/10 min at 230° C. under a load of 2.16 kgf in accordance with Japanese Industrial Standards (JIS) K7210.

98. A thermoplastic elastomer composition for a powder material used for slush molding according to claim 97 further comprising 5 to 250 parts by mass of an ethylene-α-olefin copolymer rubber 100 parts by mass of hydrogenated copolymer.

99. A thermoplastic elastomer composition for a powder material used for slush molding according to claim 97 wherein the polypropylene resin comprises a propylene-α-olefin copolymer having a melting point of 120° to 145° C. measured with a differential colorimeter at a heating rate of 5° C./min.

100. A thermoplastic elastomer composition for a powder material used for slush molding according to claim 98 wherein the polypropylene resin comprises a propylene-α-olefin copolymer having a melting point of 120° to 145° C. measured with a differential colorimeter at a heating rate of 5° C./min.

101. A thermoplastic elastomer composition for a powder material used for slush molding according to claim 97 further comprising 0.02 to 5.0 parts by mass of an organic peroxide per 100 parts by mass of the polypropylene resin.

102. A thermoplastic elastomer composition for a powder material used for slush molding according to claim 98 further comprising 0.02 to 5.0 parts by mass of an organic peroxide per 100 parts by mass of the polypropylene resin.

103. A thermoplastic elastomer composition for a powder material used for slush molding according to claim 97 further comprising a process oil.

104. A thermoplastic elastomer composition for a powder material used for slush molding according to claim 98 further comprising a process oil.

105. A thermoplastic elastomer composition for a powder material used for slush molding according to claim 97 wherein the thermoplastic elastomer composition is freeze-pulverized to produce particles having a size to pass through a sieve not greater than 1.00 mm.

106. A thermoplastic elastomer composition for, a powder material used for slush molding according to claim 98 wherein the thermoplastic elastomer composition is freeze-pulverized to produce particles having a size to pass through a sieve not greater than 1.00 mm.

107. A thermoplastic elastomer composition for a powder material used for slush molding according to claim 97 wherein the thermoplastic elastomer composition is treated by hot-cutting in water to produce particles having an effective mean diameter of 1.00 mm or less.

108. A thermoplastic elastomer composition for a powder material used for slush molding according to claim 98 wherein the thermoplastic elastomer composition is treated by hot-cutting in water to produce particles having an effective mean diameter of 1.00 mm or less.

109. A skin formed by slush molding powder made from a thermoplastic elastomer composition as recited in any of claims 1–108.

* * * * *